(No Model.) 4 Sheets—Sheet 1.
H. KUHN.
VIGNETTER.

No. 363,961. Patented May 31, 1887.

Attest:
J. W. Hoke.
P. S. Bowman

Inventor:
Henry Kuhn
by C. D. Moody
atty (No Model.) 4 Sheets—Sheet 3.

H. KUHN.
VIGNETTER.

No. 363,961. Patented May 31, 1887.

Attest:
J. W. Hoke.
P. S. Bowman

Inventor:
Henry Kuhn
by C. Moody
atty (No Model.) 4 Sheets—Sheet 4.

H. KUHN.
VIGNETTER.

No. 363,961. Patented May 31, 1887.

Attest;
J. W. Hoke.
T. S. Bowman

Inventor;
Henry Kuhn
By C. D. Moody
atty

UNITED STATES PATENT OFFICE.

HENRY KUHN, OF ST. LOUIS, MISSOURI.

VIGNETTER.

SPECIFICATION forming part of Letters Patent No. 363,961, dated May 31, 1887.

Application filed March 15, 1886. Serial No. 195,368. (No model.)

*To all whom it may concern:*

Be it known that I, HENRY KUHN, of the city of St. Louis, Missouri, have made a new and useful Improvement in Vignetters, of which the following is a full, clear, and exact description.

The present device is used in connection with an ordinary photographer's camera, it being placed within the camera between the lens and the negative and employed in the production of photographs with a dark background.

Figure 1:
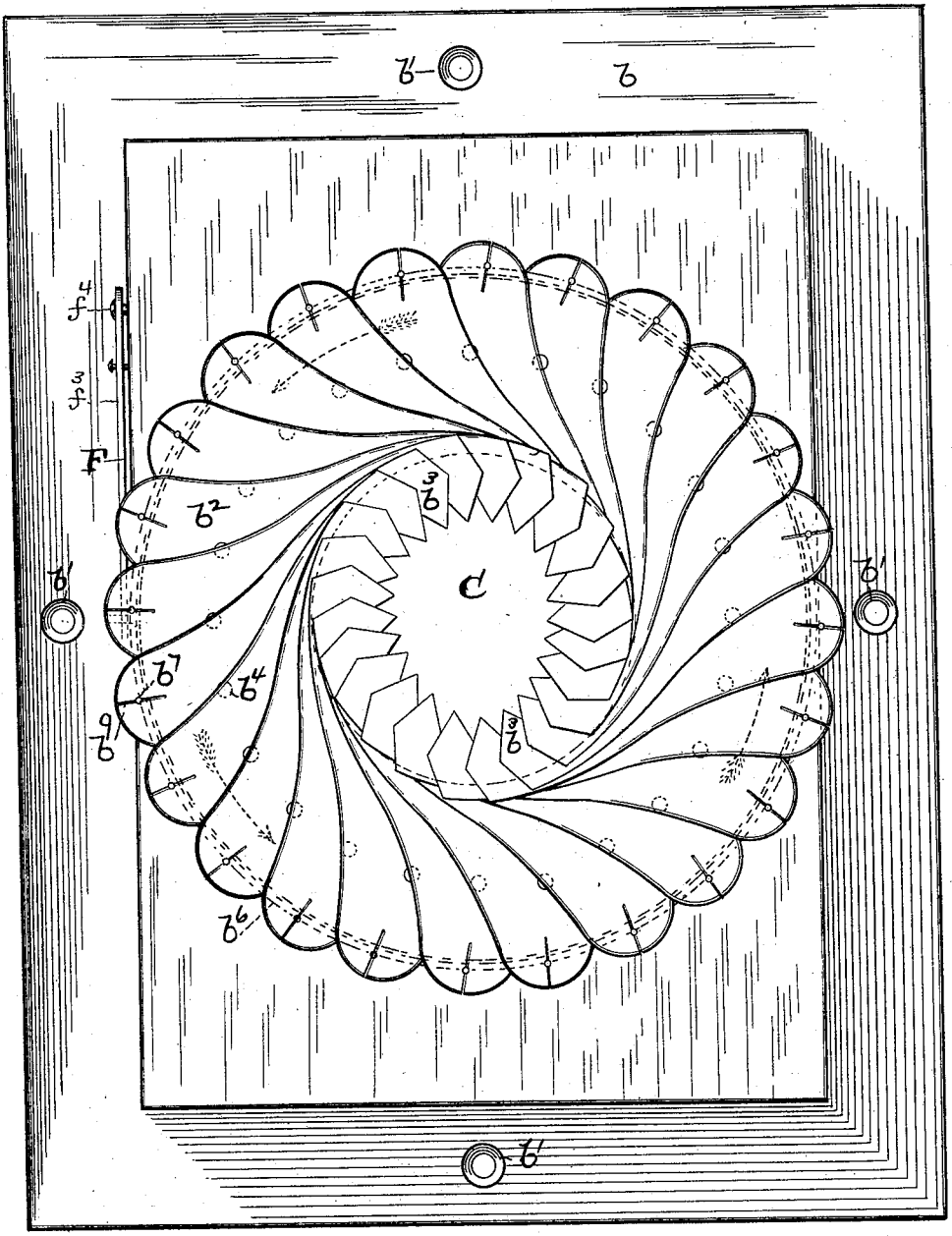
Figure 2:
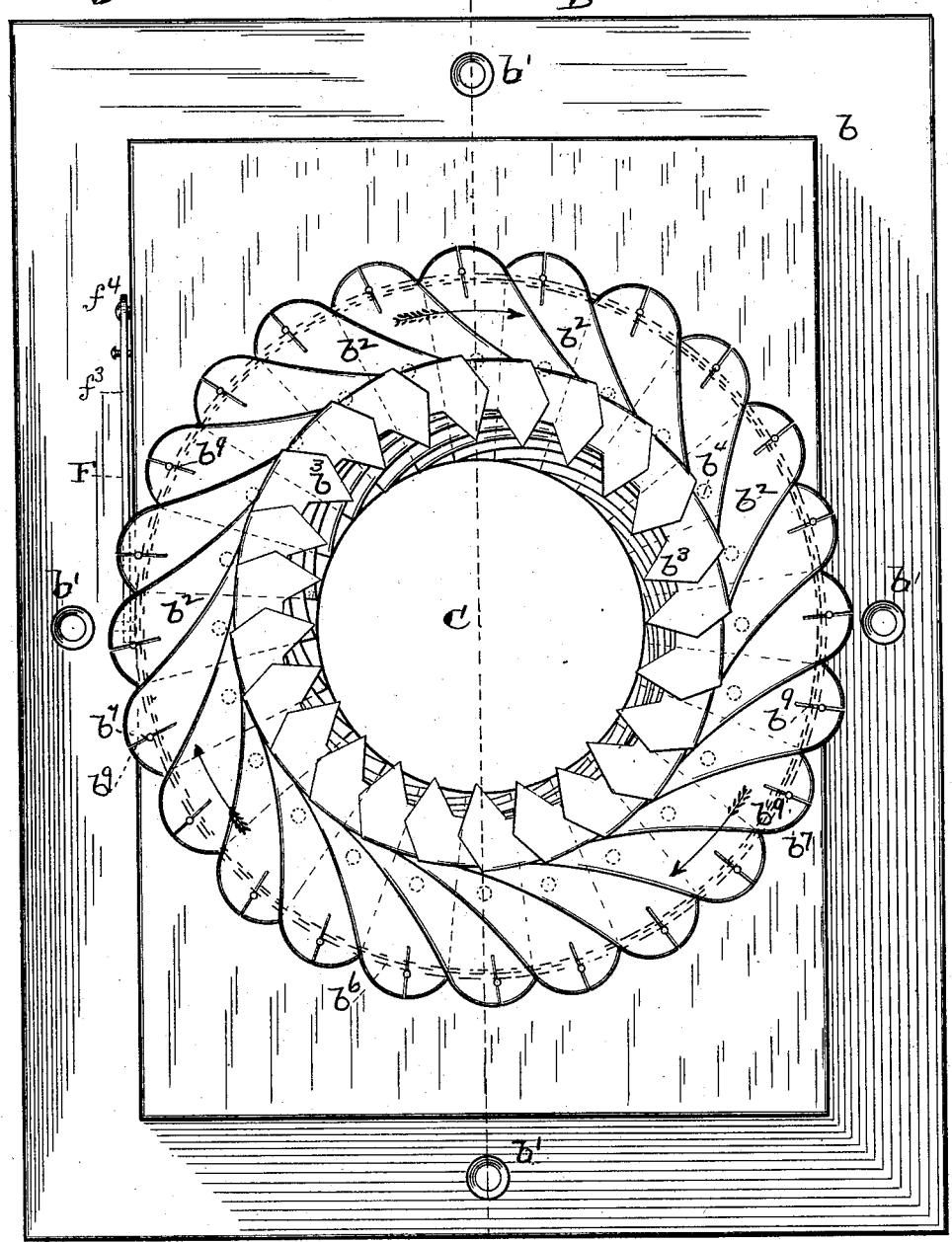
Figure 3:
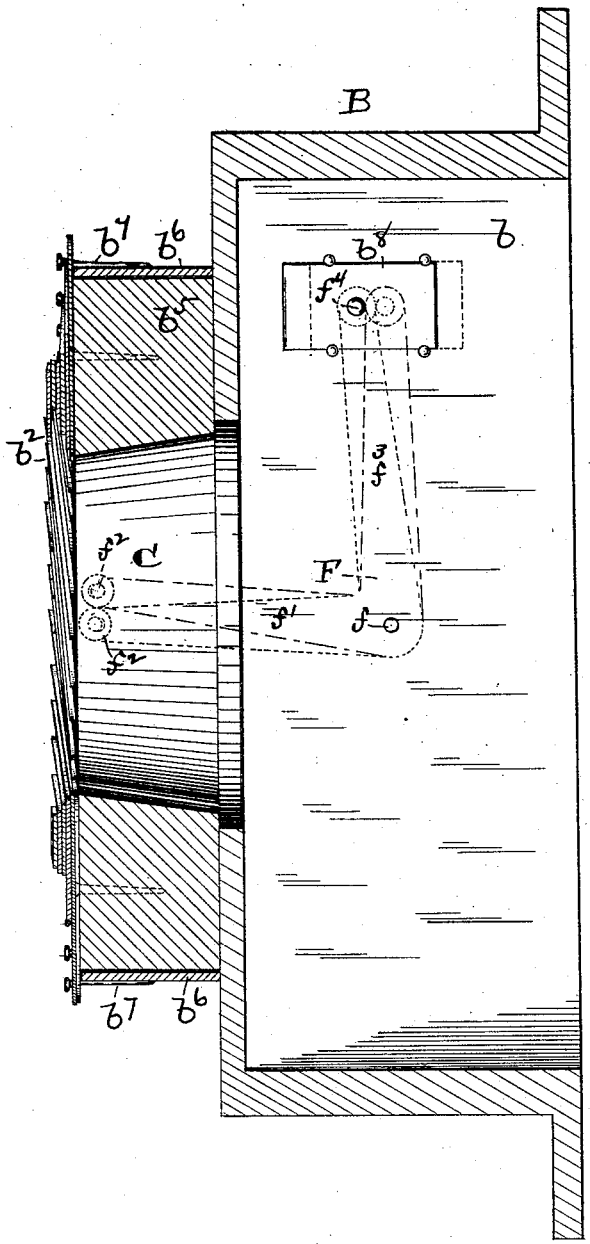
Figure 4:
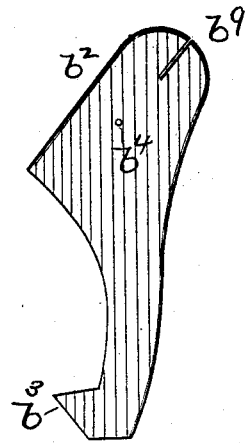
Figure 5:
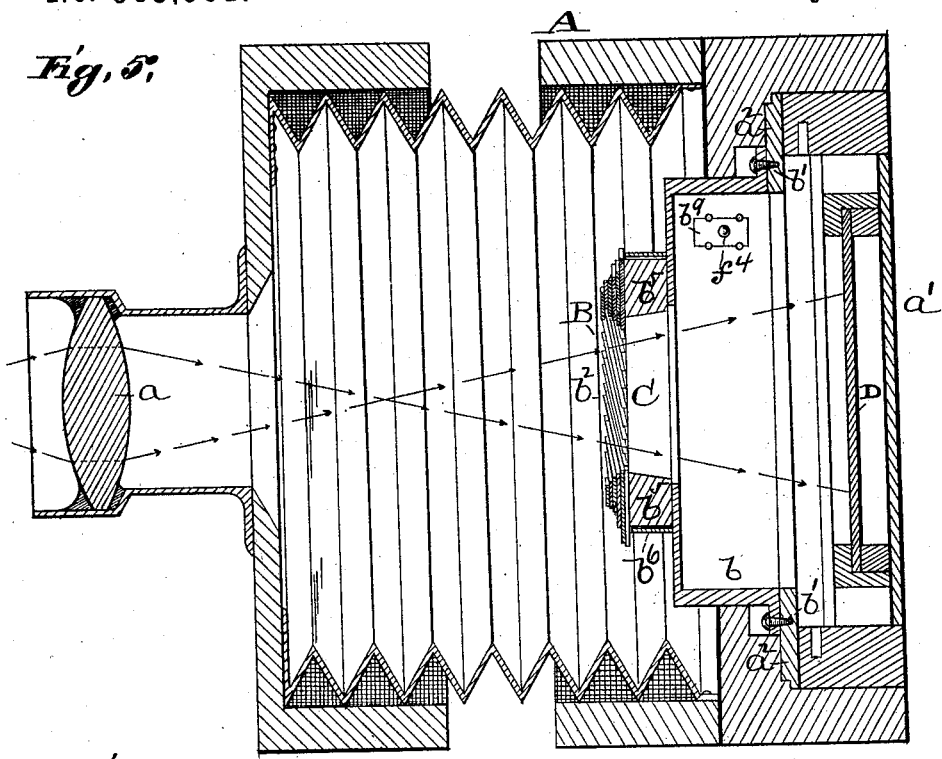
Figure 6:
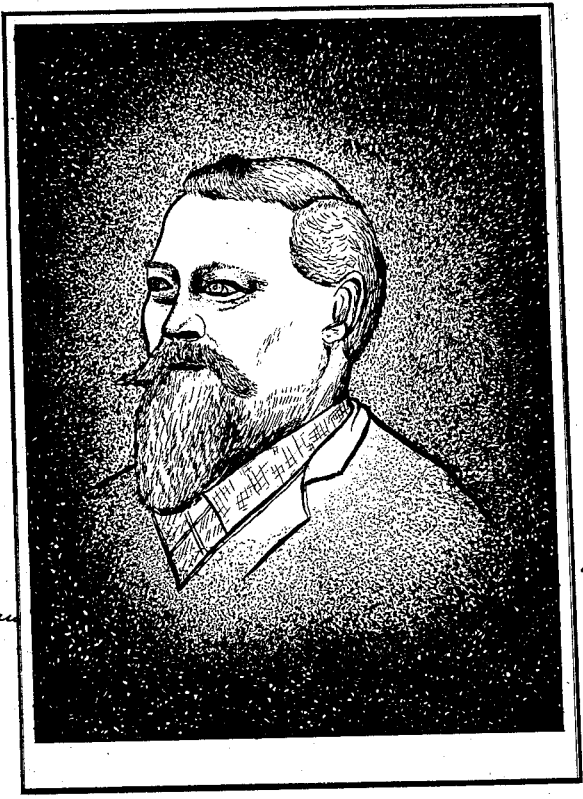

In the annexed drawings, making part of this specification and exhibiting the most desirable mode of carrying out the improvement, Figure 1 is a rear elevation of the vignetter, its central opening being contracted to or toward its smallest diameter. Fig. 2 is a similar view, the central opening being enlarged. Fig. 3 is a longitudinal section on the line 3 3 of Fig. 2. Fig. 4 is a side elevation of one of the adjustable points used in forming the vignetter. Fig. 5 is a longitudinal section of a camera having the improvement in position for use, and Fig. 6 may be used to represent the kind of picture produced.

The same letters of reference denote the same parts in the several figures of the drawings.

The camera A, Fig. 5, is of the ordinary type, having the customary lens, $a$, and being constructed at the plate-holder end $a'$ in the usual manner.

B represents the vignetter in question. It is interposed between the lens and the plate-holder, and it is readily and conveniently held in place by screwing its frame $b$, as at $b'$, to the frame-work $a^2$ of the camera. The function of the vignetter is to prevent the passage of the light to the negative saving in the immediate vicinity of the picture being photographed, and also to produce the customary vignette effect. It is also very desirable to be able to enlarge and diminish the central opening in the vignetter to suit the size of picture taken, and to accomplish this by means accessible to the operator in the rear of the camera, but not in the way of the passage of the light. With these ends in view a series of what may be termed "points," $b^2$, are employed. The shape of the point is indicated in Fig. 4, it being in effect a flat lever, at the inner end being shaped to form the point $b^3$, between its ends, at $b^4$, being perforated to enable it to be pivoted to a frame, as hereinafter specified, and at its outer end being slotted at $b^9$. These points $b^2$ are adjusted to jointly form a circular series, substantially as is represented in Figs. 1 and 2. The points are laid in a spiral manner around the opening, and so at the inner end, to jointly form a serrated or the equivalent of a serrated edge around the opening C, through which the light from the lens $a$ passes to the plate D, upon which the impression is taken. The vignetter is enlarged and diminished in the following manner, preferably: The points $b^2$ at $b^4$ are pivoted to a circular frame or rim, $b^5$, Figs. 3 and 5, upon the front end of the frame $b$. Encircling the rim is a band, $b^6$, provided with pins $b^7$, which respectively engage in the slots $b^9$ of the points $b^2$. By turning the band $b^6$ around upon the rim $b^5$ the points $b^2$, by reason of the engagement of the pins $b^7$ in the slots $b^9$, are swung upon their respective pivots $b^4$, and the effect of the movement of the points $b^2$ is the enlarging or lessening of the vignetter-opening C, according to the direction in which the band $b^6$ is turned.

Fig. 1 shows the points adjusted to diminish the opening, and Fig. 2 shows them adjusted to enlarge the opening.

The band $b^6$ is operated by means of a bell-crank, F, which is pivoted at $f$ to the vignetter-frame $b$, and whose arm $f'$ is pivoted at $f^2$ to the band $b^6$, and whose arm $f^3$ is provided with a pin or handle, $f^4$, which extends through the frame $b$ to the inner side thereof, the frame being perforated at $b^8$ to admit the bell-crank handle, and to provide for its movement in operating the vignetter, which operation is effected from the rear end of the camera A, and by taking hold of the handle $f^4$ within the frame $b$ and turning the bell-crank on its pivot, and according to the direction in which the bell-crank is turned is the band $b^6$ adjusted.

The vignetter, substantially as described, can be used as an attachment to the ordinary photographer's camera.

I claim—

1. The expansible and contractible vignetter

B, consisting of the circular series of pivoted points $b^2$, forming, whether expanded or contracted, a continuous serrated edge around the opening C, as described.

2. The combination of the frame $b$, the pivoted points $b^2$, slotted at $b^3$, the rim $b^5$, the band $b^6$, the pins $b^7$, and the bell-crank F, pivoted and connected substantially as described.

Witness my hand.

HENRY KUHN.

Witnesses:
    C. D. MOODY,
    J. W. HOKE.